Nov. 8, 1927.                                                    1,648,808
L. A. HAZELTINE
WAVE SIGNALING SYSTEM
Filed Feb. 27, 1925           5 Sheets-Sheet 1
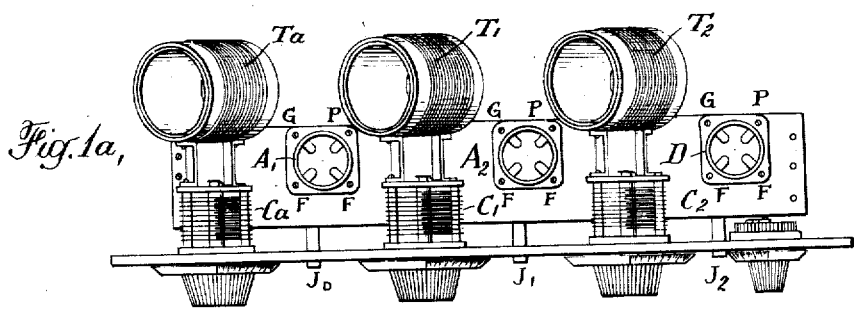
Fig. 1a,
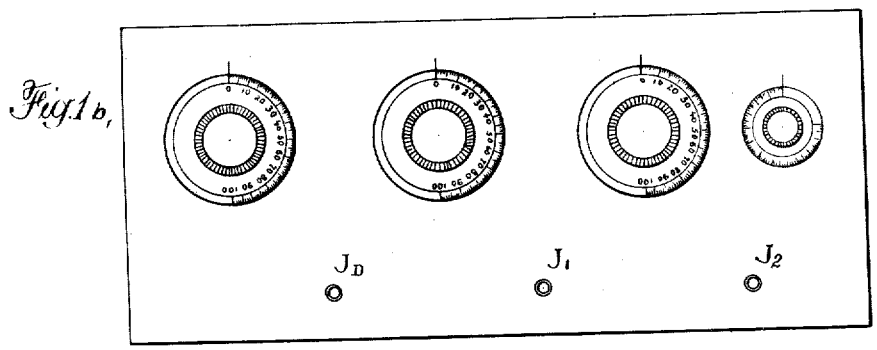
Fig. 1b,
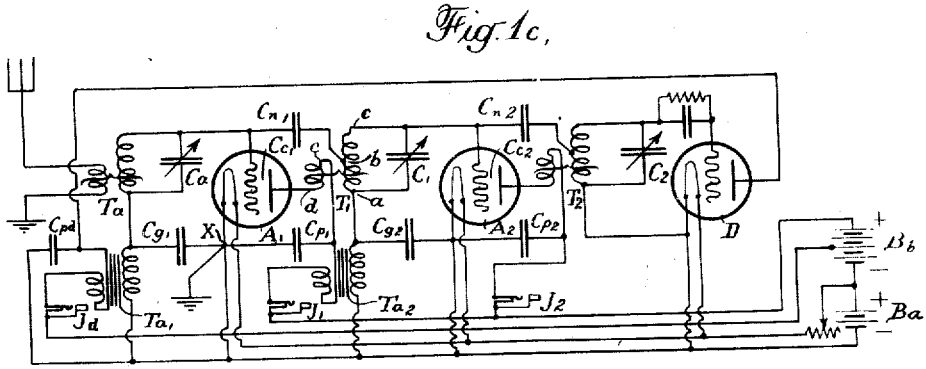
Fig. 1c,
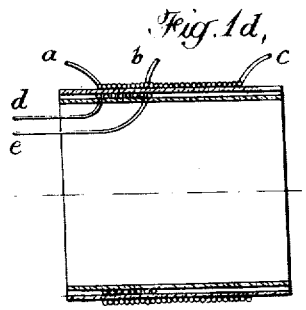
Fig. 1d,
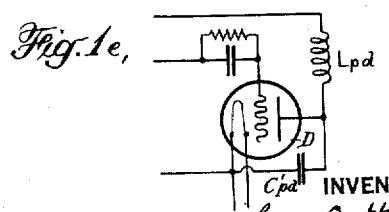
Fig. 1e,
INVENTOR
Louis A. Hazeltine
BY
Pennie, Davis, Marvin and Edmonds
ATTORNEY Nov. 8, 1927.
L. A. HAZELTINE
1,648,808
WAVE SIGNALING SYSTEM
Filed Feb. 27, 1925   5 Sheets-Sheet 2
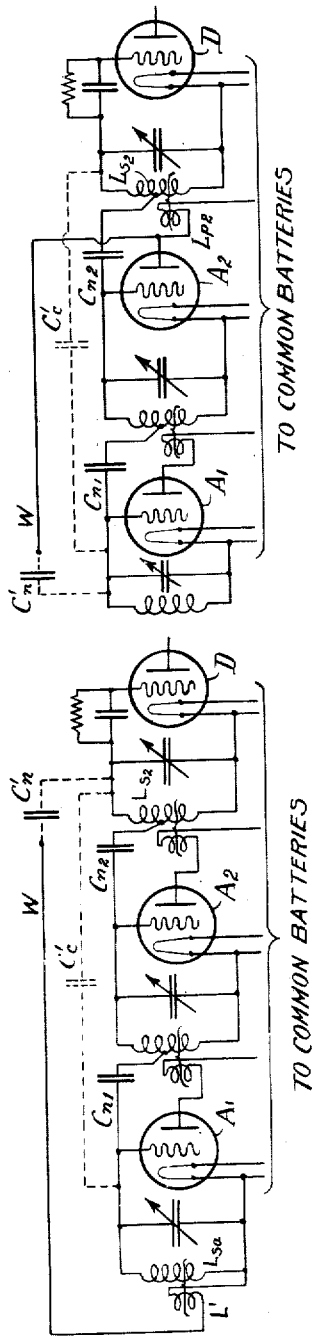
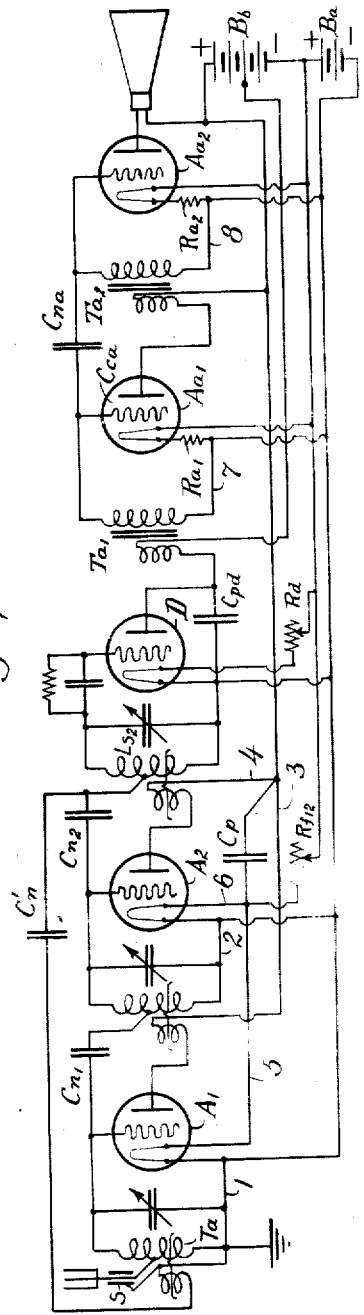
INVENTOR
Louis A. Hazeltine
BY
Pennie, Davis, Marvin & Edmonds
ATTORNEY

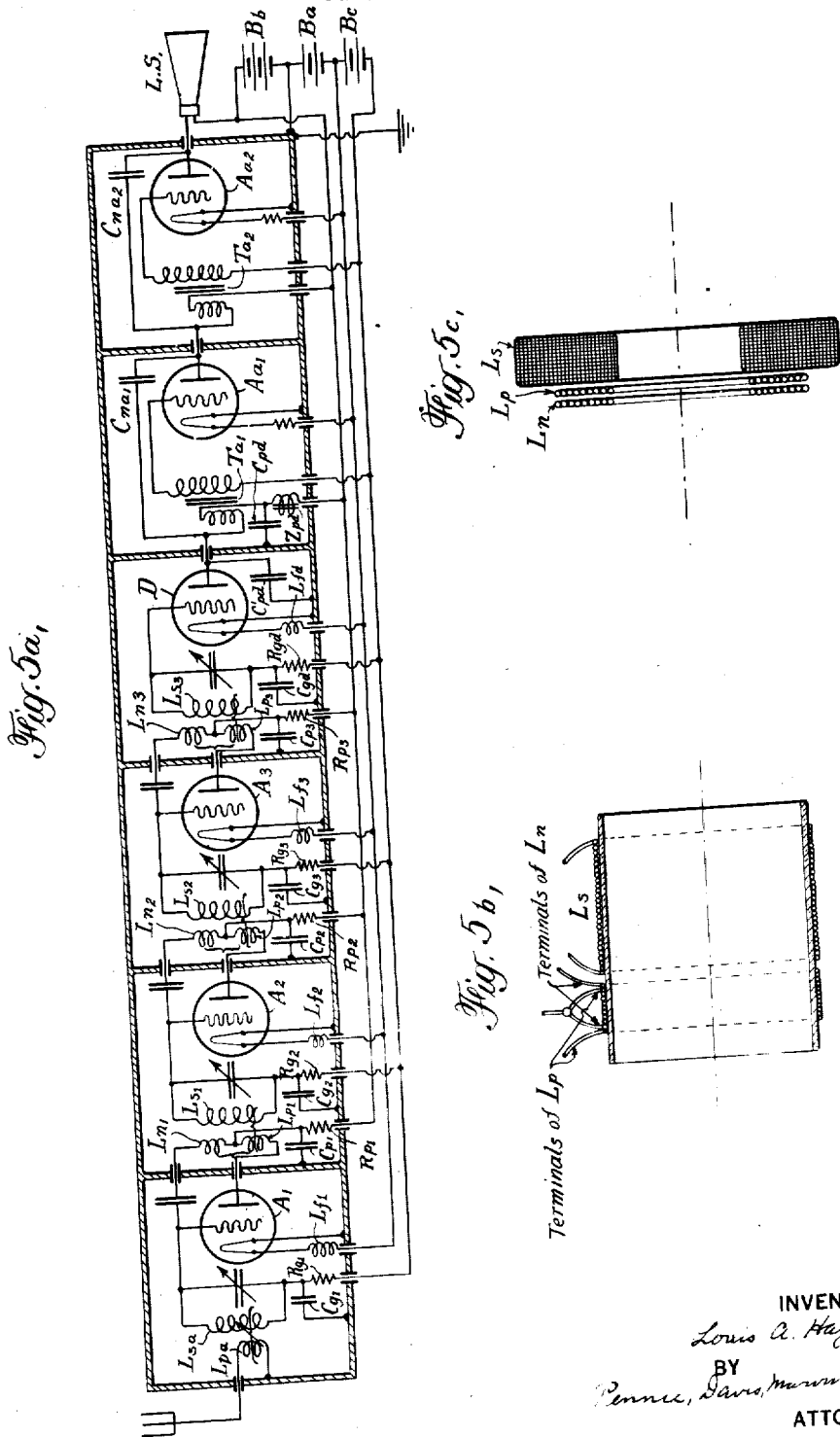

Nov. 8, 1927. 1,648,808

L. A. HAZELTINE

WAVE SIGNALING SYSTEM

Filed Feb. 27, 1925   5 Sheets-Sheet 4

INVENTOR
Louis A. Hazeltine
BY
Pennie Davis, Marvin and Edmonds
ATTORNEY

Nov. 8, 1927.  
L. A. HAZELTINE  
1,648,808  
WAVE SIGNALING SYSTEM  
Filed Feb. 27, 1925  
5 Sheets-Sheet 5
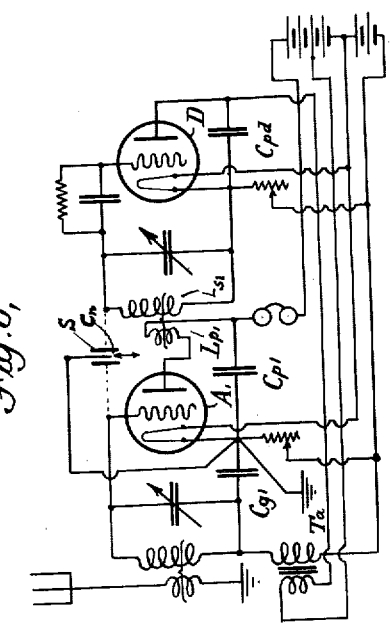
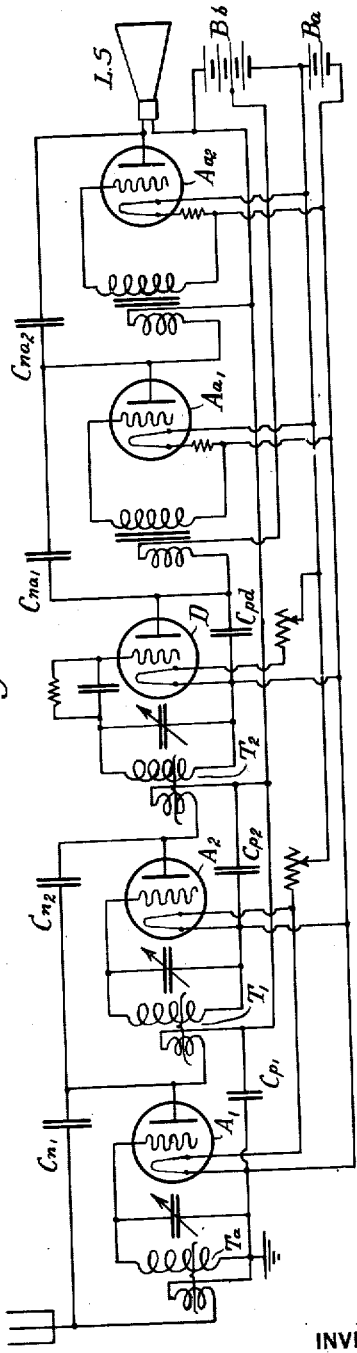
INVENTOR  
Louis A. Hazeltine  
BY  
Pennie, Davis, Marvin and Edmonds  
ATTORNEY Patented Nov. 8, 1927.

1,648,808

UNITED STATES PATENT OFFICE.

LOUIS A. HAZELTINE, OF HOBOKEN, NEW JERSEY, ASSIGNOR TO HAZELTINE CORPORATION, A CORPORATION OF DELAWARE.

WAVE SIGNALING SYSTEM.

Application filed February 27, 1925, Serial No. 12,000, and in Canada May 4, 1925.

This invention relates to wave signaling systems, particularly radio receiving systems, and has for its object the provision of a radio receiver which is highly sensitive and highly selective and at the same time is simple to control. This result is accomplished primarily by employing tuned radio-frequency amplification, preferably in more than one stage, with the complete elimination of coupling between the plate circuits and the grid circuits, except through the mutual conductance of the amplifying vacuum tubes, and with an arrangement of the amplifier transformers so that their input conductances are related in a certain way to the conductances of the vacuum tubes. Other features of the invention have to do with particular arrangements of the apparatus in ways that are both convenient and efficacious, as will appear in the discussion which follows.

The elimination of coupling between the plate circuits and the grid circuits is accomplished by the cooperation of three steps: First, the arrangement of the amplifier transformers so that there is no magnetic coupling between any two of them; second, the avoidance in the wiring of any substantial impedance common to two or more tuned circuits; and third, the neutralization of the natural capacity coupling inherent between the tuned circuits, including particularly that due to the capacity between the grid and the plat of the vacuum tube.

The elimination of undesirable coupling between the plate and grid circuits results in the prevention of feed-back or regenerative action; and consequently there is no tendency towards a condition of unstability, or the production of local oscillations. Such regenerative action is most troublesome with sharply tuned circuits and at high frequencies; so greater refinement is necessary for its prevention in tuned radio-frequency amplifiers than in other forms of amplifiers, such as those employing iron-core transformers, as represented in Figures 3, 4, 7 and 8 of my U. S. Letters Patent No. 1,489,228 and No. 1,533,858.

The proper input conductance of the amplifier transformers is obtained by employing a primary winding of fewer turns than has previously been the practice. The results are: (1) high selectivity; (2) substantially complete neutralization of capacity coupling over a wide range of frequency with fixed neutralizing adjustments, even though there be slight unavoidable deviations from the ideal conditions for neutralization; and (3) higher amplification than is obtained with the large number of primary turns previously customary.

Referring to the drawings:

Figures 1$^a$ and 1$^b$ show a plan and an elevation respectively of a tuned radio-frequency amplifier embodying the features of this invention.

Figure 1$^c$ shows the diagram of connections of the receiver of Figures 1$^a$ and 1$^b$.

Figure 1$^d$ shows the structure of the radio-frequency amplifier transformers of Figures 1$^a$ and 1$^b$.

Figure 1$^e$ shows a modification of the circuit of Fig. 1$^c$.

Figures 2 and 3 show alternative methods for neutralizing capacity coupling between non-adjacent tuned circuits.

Figure 4 shows the connections of a complete radio receiver including neutralization of capacity coupling between non-adjacent tuned circuits.

Figure 5$^a$ shows the connections of a radio receiver having three stages of radio-frequency amplification and including certain refinements for the more complete elimination of undesired couplings.

Figures 5$^b$ and 5$^c$ show structures of radio-frequency amplifier transformers suited to the circuit of Figure 5$^a$, for two different ranges in radio frequency.

Figure 6:
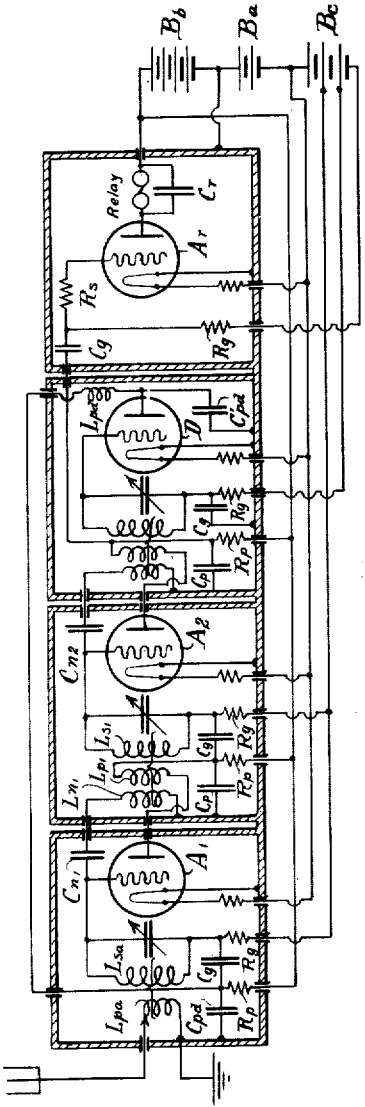
Figure 7:
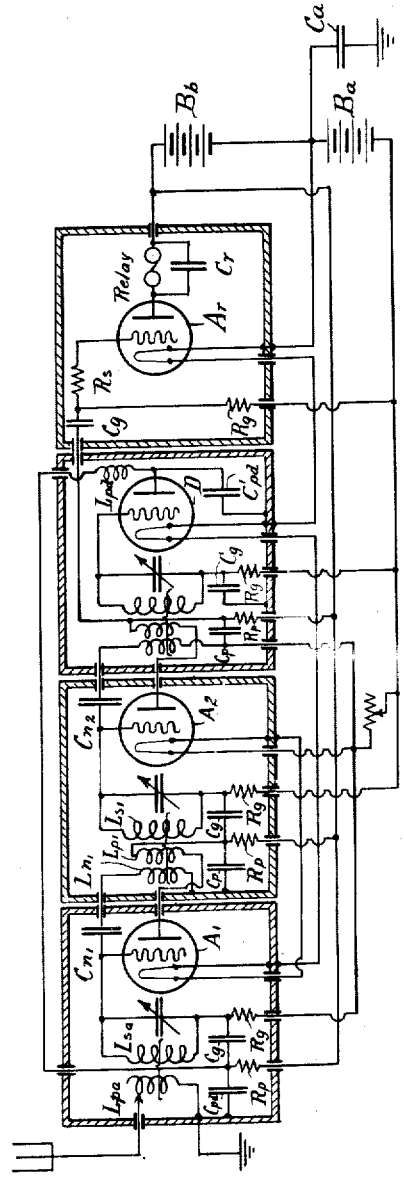

Figures 6 and 7 show the connections of radio receivers for telegraph purposes employing a relay and have the vacuum tube filaments connected respectively in parallel and in series.

Figure 8 shows the connections of a radio receiver employing natural inherent capacity for neutralization.

Figure 9 shows the connections of a nonradiating receiver employing a regenerative detector tube.

Figure 10 shows the connections of a radio receiver similar to that of Figure 4, but employing an alternative method of neutralization.

In the radio receiver represented in Figures 1ª and 1ᵇ there are three radio-frequency transformers $T_a$, $T_1$, $T_2$, each associated with a tuning condenser $C_a$, $C_1$, $C_2$. Each coil is mounted on the back of its condenser for the purpose of keeping as short as possible the leads between them, and for other purposes as disclosed in my U. S. Letters Patent No. 1,577,421 and in my pending application Serial Number 40,488, filed June 30, 1925. The vacuum tubes are mounted adjacent to the coils and condensers with which they are associated, also in order to keep the connecting leads as short as possible. The coils of each transformer are preferably of the single-layer type, as illustrated in Figure 1ᵈ, and are mounted with axes parallel and at an angle of substantially 55 degrees with the line of centers, this being a convenient arrangement resulting in zero magnetic coupling between any two of the transformers, as described in my patent and co-pending application above referred to. Care is also taken to avoid magnetic coupling between stages that might be due to closed conducting loops linked with the fields of two or more transformers. Such loops might exist in a supporting metal frame-work, or in the leads from the batteries, which leads are therefore preferably bunched together.

Figure 1ᶜ shows the diagram of connections for the receiver of Figures 1ª and 1ᵇ. The reflex principle is employed by which radio-frequency amplifying tubes $A_1$ and $A_2$ serve also as audio-frequency amplifying tubes through the use of two audio-frequency transformers $T_{a1}$ and $T_{a2}$. The jacks $J_D$, $J_1$, $J_2$ enable a head telephone receiver or loud-speaker to be plugged in the plate circuit of the detector tube or either of the audio-frequency amplifier tubes.

Since each coil of an audio-frequency transformer has a high impedance to radio-frequency current, by-pass condensers $C_{g1}$, $C_{g2}$, $C_{p1}$, $C_{p2}$, $C_{pd}$ are arranged to provide low-impedance return paths for the radio-frequency grid and plate currents direct to the respective filaments. This keeps radio-frequency currents out of the common battery leads, which may have sufficient reactive impedance as to cause objectionable coupling if they carry radio-frequency currents of different stages. The grid by-pass capacities $C_{g1}$, $C_{g2}$ may be of the order of one ten-thousandth microfarad, and the plate by-pass capacities $C_{p1}$, $C_{p2}$, $C_{pd}$, may be of the order of one thousandth microfarad, these values giving low radio-frequency impedances but sufficiently high audio-frequency impedances not to shunt unduly the audio-frequency transformer coils and so lower the audio-frequency amplification. The leads to the by-pass condensers should be short to minimize their reactive impedances.

In case the radio-frequency current in the plate circuit of detector tube D passes in appreciable amount through the primary of $T_{a1}$ and so couples tube D with tube $A_1$, then a radio-frequency impedance $L_{pd}$ (Figure 1ᶜ) may be inserted in the lead from the plate of tube D, and a condenser $C'_{pd}$ may be connected directly from this plate to the filament. Care must be taken that the impedance coil $L_{pd}$ is not coupled magnetically to any of the radio-frequency transformers.

The filament system should be grounded, preferably at X, Figure 1ᶜ, so that radio-frequency current passing from the antenna through the natural capacity between the coils of $T_a$ will flow directly to ground and not through the battery leads to the other tuned circuits and thence through their natural capacities to ground, which would result in undesirable coupling between the stages.

Coupling between the plate circuit and the grid circuit of tube $A_1$, due to the natural capacity $C_{c1}$ between the grid with its connected apparatus and the plate with its connected apparatus, is neutralized by the neutralizing capacity $C_{n1}$ connected between the grid and the auxiliary coil $ab$, which in Figure 1ᶜ is a portion of the secondary coil $ac$ of transformer $T_1$. As explained in my U. S. Letters Patent. No. 1,489,228, neutralization will be effected when the primary coil $de$ and the auxiliary coil $ab$ are closely coupled electromagnetically and have terminals $a$ and $e$, which connect to the filament system, of opposite polarity and when the ratio of the number of turns of $ab$ to the number of turns of $de$ is equal to the ratio of $C_{c1}$ to $C_{n1}$. The same arrangement and relation applies, of course, to the neutralizing capacity $C_{n2}$ and the output transformer $T_2$, associated with the second amplifier tube $A_2$.

Figure 1ᵈ shows the construction of the transformers $T_1$ and $T_2$. The primary winding $de$ is mounted so as to have close magnetic coupling to the tapped portion $ab$ of the secondary coil $ac$, the tap $b$ connecting to the neutralizing condenser $C_{n1}$ or $C_{n2}$, as shown in Figure 1ᶜ. To make the coupling as close as possible between the auxiliary coil $ab$ and the radio-frequency plate circuit, the leads from $d$ and $e$ and the leads to the plate by-pass condenser $C_{p1}$ or $C_{p2}$, Figure 1ᶜ, should be made as short as possible. Such closeness of coupling is needed because the radio-frequency current flowing conductively through the plate of the vacuum tube would build up an appreciable voltage in the leakage reactance of the plate circuit, which voltage would not be balanced by a voltage in the auxiliary coil $ab$. The primary and secondary coils in Figure $1^d$ are wound in the same direction, with the result that terminal $a$ connecting to the filament system, Figure $1^c$, is of opposite polarity to terminal $e$ also connected to the filament system (or, in other words, the low-potential terminals $a$ and $e$ are of opposite polarity, and the same is therefore true of the high-potential terminals $c$ and $d$), as required for the purpose of neutralization. The connection of the neutralizing condenser to a tap $b$ so that $ab$ is a small portion of the secondary winding allows close coupling to be obtained between $ab$ and $de$ and at the same time requires the primary winding $de$ to extend under only a small portion of the secondary, thus minimizing natural capacity and dielectric loss due to the dielectric field between primary and secondary. The primary winding, as indicated, is placed adjacent to the filament end $a$ of the secondary winding, for the same purpose.

In general there will exist natural capacity between the apparatus connected to the grid of $A_1$ and apparatus connected to the grid of $A_2$. Such natural capacity has a neutralizing tendency and so in part supplants $C_{n_1}$. This neutralizing capacity is relatively more effective, for a given value, as the ratio of turns of $ac$ to $de$ is greater than that of $ab$ to $de$. Since $ac$ is not so closely coupled to $de$, such neutralization is not ideal and therefore should be minimized. This may be accomplished by making as short as possible all leads connecting to the grid, and by employing tuning condensers of the shielded type or a grounded metal plate on the back of the panel. Other grounded conductors, such as the battery leads and the audio-frequency transformers, interposed in the dielectric fields between the tuned circuits also serve as partial shields.

On account of the difficulty of accurately measuring or calculating very small capacities, particularly natural capacities, the proper neutralizing capacities $C_{n_1}$ and $C_{n_2}$, Figure $1^c$, are in practice determined by trial. A suggested procedure for neutralizing is as follows: First, with the filament of $A_2$ cold and those of $A_1$ and $D$ lighted, a strong signal is tuned in, as heard on a telephone receiver plugged in the detector plate circuit; $C_{n_2}$ is then adjusted until the signal disappears, showing that no coupling exists between the plate circuit and the grid circuit of $A_2$. Then with the filaments of $D$ and $A_2$ lighted and that of $A_1$ cold, the process is repeated with $C_{n_1}$.

On account of the proximity of the radio-frequency transformers to one another and more especially of the presence of a loop formed by the leads between each secondary and its tuning condenser, the actual coil inclination for zero magnetic coupling may differ slightly, but appreciably, from its theoretical value of substantially 55 degrees. Hence, the proper inclination must also be determined by trial, and may be in accordance with the following procedure. With all coils at the same inclination, $C_{n_1}$ and $C_{n_2}$ are adjusted for zero coupling as described in the preceding paragraph, with the circuits tuned first for a low frequency and then for a high frequency. In general, the settings found for the two frequencies will be different, showing that the capacity coupling, which varies with the frequency, is being called upon to compensate for some magnetic coupling. The coil inclinations are then varied together, until the settings of $C_{n_1}$ and $C_{n_2}$ are found to be the same at the two extreme frequencies.

The determination of the proper coil angle need ordinarily be made only once for a given design of receiver, but the adjustments of the neutralizing capacities are made in each individual receiver in order to assure complete stability.

The use of short grid leads, the separation of the tuned circuits, and the interposition of grounded conductors, all serve to minimize the natural capacity coupling between $T_a$ and $T_2$ Figure $1^c$. In addition, the antenna lead-in should be kept, as indicated, at the end of the receiver remote from the circuit of $T_2$; and ungrounded conductors should not be allowed to extend from the neighborhood of $T_a$ to the neighborhood of $T_2$. By taking these precautions, the natural capacity coupling between $T_a$ and $T_2$ may be substantially eliminated, and so need not be neutralized.

When the telephone receiver is plugged into the third jack $J_2$, the plate and grid circuits of the tube $A_1$ will have the same natural audio frequency if the transformers $T_{a1}$ and $T_{a2}$ are alike. This would tend to give considerable audio-frequency regeneration due to the coupling capacity $C_{c1}$ between the plate and the grid of $A_1$. This coupling capacity will be neutralized by $C_{n_1}$ for audio frequency, provided the ratio of turns in the audio-frequency transformer $T_{a2}$ is the same as the ratio of turns of $ab$ to $de$ and its relative polarity is as indicated,—that is, the same condenser serves to neutralize capacity coupling both at radio frequency and at audio frequency.

We will now consider the proper value of the effective ratio $r$ of secondary turns $ac$ to primary turns $de$ in the amplifying transformers. (By "effective ratio" is meant the ratio that would give the same mutual inductance with the same secondary self-inductance if the coupling between primary and secondary had a coefficient of unity. If the coupling is actually less than unity, the number of primary turns must be correspondingly increased relative to the number of secondary turns.) The amplification for one stage is given by the expression $$\frac{\mu \tau g_p}{\sqrt{[g_p + \tau^2 g_s]^2 + \tau^4[\omega C_s - 1/(\omega L_s)]^2}} \quad (1)$$

where the symbols have the following significances:

$\mu$, amplification factor of vacuum tube;
$\omega$, angular frequency;
$C_s$, $L_s$, $g_s$, capacity, self-inductance and conductance of secondary circuit;
$g_p$, plate conductance of vacuum tube.

At resonance the above expression for amplification reduces to $$\frac{\mu \tau g_p}{g_p + \tau^2 g_s}, \quad (2)$$

which has its maximum value when $$g_p = \tau^2 g_s. \quad (3)$$

Since at resonance the input conductance of the transformer is equal to $\tau^2 g_s$, the last condition may be expressed in the form: that the amplification at resonance is a maximum when the ratio of turns of the transformer is so chosen that the input conductance of the transformer is equal to the plate conductance of the vacuum tube. If the number of primary turns is reduced below this value, the amplification falls off, but less rapidly at resonance than at other frequencies. For example, if the number of primary turns is halved relative to its value for maximum resonant amplification, the amplification at frequencies far from resonance is also halved, but the amplification at resonance is reduced only twenty per cent. The result is a decided gain in selectivity, since interfering signals are weakened proportionately more than the signal tuned in. Thus to obtain high selectivity together ,with good amplification, the ratio of turns $\tau$ should be so chosen that the input conductance $\tau^2 g_s$ is substantially, but not greatly, higher than the plate conductance $g_p$.

The following values are representative of present-day practice in radio telephone broadcast reception:

$\mu = 8$;
$\omega = 5$ radians per microsecond;
$L_s = 0.25$ millihenry;
$C_s = \dfrac{1}{\omega^2 L_s} = 0.16$ millimicrofarad;

$g_s = 0.005 \omega C = 0.004$ millimho (this value includes the conductance of the coil $L_s$, that of the condenser $C_s$, and that of the grid-filament circuit, the last ordinarily being negligible when a grid bias is used, as by the battery $B_c$, Figure 5ª);

$g_p = 0.1$ millimho.

If we use one-half the optimum number of primary turns, the effective turn ratio will be $$\tau = 2\sqrt{\frac{g_p}{g_s}} = 2\sqrt{\frac{0.1}{0.004}} = 10.$$

The amplification at resonance is then $$\frac{\mu \tau g_p}{g_p + \tau^2 g_s} = \frac{8 \times 10 \times 0.1}{0.1 + 10^2 \times 0.004} = 16$$

With the form of transformer shown in Figure 1ᵈ, the following design data will give constants approximating those listed in the preceding paragraphs: secondary coil, 60 turns of No. 24 A. W. G. double-cotton-covered copper wire wound closely on a three-inch cylindrical tube of good dielectric material; primary coil, 8 turns of the same or smaller wire wound on a 2.75-inch tube and spaced so as to lie under the tapped portion of the secondary coil.

The transformer $T_a$ preferably has a like secondary coil to $T_1$ and $T_2$, but its primary coil usually should have more turns, especially if the antenna to be employed is of small capacity and resistance. With a considerable step-up ratio, the capacity and resistance of the antenna are equivalent to much smaller capacity and resistance in the secondary circuit.

The fairly close coupling between the primary coil and the secondary coil of $T_a$, $T_1$ and $T_2$ allows the primary and secondary circuits of each of these transformers to be tuned as a unit by the secondary condenser.

With the antenna polarity indicated for $T_a$, Figure 1ᶜ, adjacent turns of primary and secondary are at the same radio-frequency potential; so there is no dielectric field between primary and secondary, as there is in $T_1$ and $T_2$. Hence, $T_a$ has less natural capacity than $T_1$ and $T_2$, which tends to compensate for the capacity added by the antenna. The three condensers being alike, the three tuning dials represented in Figure 1ᵇ will thus read nearly alike when all are adjusted to any one frequency. This greatly simplifies the process of tuning the receiver.

The result just described, i. e. that all tuning dials will read substantially alike when in proper adjustment for reception, is, of course, dependent on the absence of regenerative action, and contrasts with prior receivers employing tuned radio-frequency amplification without the elimination of undesirable coupling between stages; for in such receivers detuning of the amplifier output circuits was ordinarily necessary for the control of regeneration and oscillation, and, in any case, the tuning adjustment was dependent upon the regeneration present, and therefore upon the state of the batteries and vacuum tubes.

Figures 2, 3 and 4 show means for neutralizing capacity coupling between the grid of $A_1$ and the grid of D, as represented by the capacity $C'_c$, in cases where it is not convenient to substantially eliminate such capacity coupling.

In Figure 2 neutralization of the coupling through $C'_c$ is accomplished by means of the auxiliary coil $L'$ and the capacity $C'_n$. Coil $L'$ is coupled to coil $L_{sa}$ with terminals of unlike polarity connected together. The number of turns of these coils and the capacity $C'_n$ are so adjusted that the effective ratio of the number of turns of $L'$ to the number of turns of $L_{sa}$ is equal to the ratio of the coupling capacity $C'_c$ to the neutralizing capacity $C'_n$, in accordance with the relation given in my U. S. Letters Patent No. 1,450,080. The required neutralizing capacity $C'_n$ is usually so small, even when very few turns are used on $L'$, that it is most conveniently obtained as the natural capacity between the wire W and the apparatus connected to the grid of tube D, the wire being brought into proximity to this apparatus and its position adjusted to give the required capacity.

In Figure 3 neutralization of the coupling through the capacity $C'_c$ is attained by adding the neutralizing capacity $C'_n$ between the plate of tube $A_2$ and the grid of tube $A_1$. This capacity is so adjusted that the effective ratio of the number of turns of primary coil $L_{p_2}$ to the number of turns of the secondary coil $L_{s_2}$ is equal to the ratio of the coupling capacity $C'_c$ to the neutralizing capacity $C'_n$. As in Figure 2, the capacity $C'_n$ is conveniently the natural capacity between the wire W and the apparatus connected to the respective grid.

The circuits of Figure 2 and Figure 3 may be completed in the same manner as in Figure 4. In this figure the neutralization of the coupling due to the natural capacity represented by $C'_c$ in Figures 2 and 3 is accomplished by a method similar to that used in Figure 2, but $C'_n$ is now connected to the tap on coil $L_{s2}$, in place of being connected to the grid end of $L_{s2}$. This makes $C'_n$ larger in the ratio of the total number of turns $L_{s2}$ to the number of turns comprised between the tap and the filament end, and allows $C'_n$ to be made in the form of a condenser structurally similar to $C_{n_1}$ and $C_{n_2}$, which may be a convenience in manufacture and in adjustment.

In practice, the proper value of $C'_n$, Figures 2, 3 and 4 is determined by trial. After $C_{n_1}$ and $C_{n_2}$ have been adjusted, as described previously, both amplifier tubes $A_1$ and $A_2$ are lighted and conditions most conducive to oscillation are established, that is, the lowest-resistance antenna circuit and the highest plate battery voltages are employed and the three circuits are carefully tuned to the highest attainable frequency. $C'_n$ is then adjusted until no oscillation and finally no regeneration can be detected.

The general arrangement of Figure 4 differs from that of Figure 1ᶜ in certain particulars. The reflex principle is not employed; so five vacuum tubes are required, instead of three, for the same number of stages of radio-frequency and audio-frequency amplification. The grid return wires 1 and 2 connect directly to the respective filament terminals, thus obviating the necessity for the condensers $C_{g_1}$ and $C_{g_2}$ of Figure 1ᶜ and at the same time avoiding coupling that might otherwise be due to the grid return currents passing through the impedance of common connections. The condensers $C_{p_1}$ and $C_{p_2}$ of Figure 1ᶜ are combined into a single condenser $C_p$, Figure 4, which should be of large capacity (preferably of the order of one-tenth microfarad or larger) and should be connected through short leads directly between the junction of the two plate return wires 3 and 4 and the junction of the two filament leads 5 and 6. The purpose of the large capacity and the short leads is to render negligible the impedance of this common path through $C_p$.

In Figure 1ᶜ the primary coil of transformer $T_a$ is separate from the secondary coil, so that any audio-frequency interference which may originate in the antenna circuit will not in appreciable degree reach the grid of tube $A_1$ and thence be amplified and transmitted to the telephone receiver through $A_1$, $T_{a2}$ and $A_2$. As the reflex arrangement is not employed in Figure 4, this separation of the primary and secondary coils of $T_a$ is not necessary; so the auto-transformer arrangement is conveniently employed, the antenna being connected to a tap on the secondary coil. To avoid capacity coupling from the antenna to the later stages, the antenna lead-in is shown surrounded by a grounded metal tube or shield S.

The filament of detector tube D, Figure 4, is controlled by a separate rheostat $R_d$ to permit the use of a sensitive detector tube requiring critical control. The two radio-frequency amplifier tubes $A_1$ and $A_2$ are controlled by a common rheostat $R_{t_{12}}$ which serves to control the degree of amplification and thence the volume of sound from the loud-speaker. It is not good practice to control the volume of sound by the use of a filament rheostat in the audio-frequency tubes, as this is likely to lead to distortion; therefore fixed resistors $R_{a_1}$ and $R_{a_2}$ are used in the filament circuits of the audio-frequency tubes $A_{a1}$ and $A_{a2}$. The grid return wires 7 and 8 are connected to the negative ends of these resistors, so as to give a suitable bias to the grids, thus reducing distortion and increasing amplification in the well-known manner.

If there is appreciable regeneration in the vacuum tube $A_{a1}$, particularly when the audio-frequency transformers $T_{a1}$ and $T_{a2}$ are alike, the neutralizing capacity $C_{na}$ may be employed. Its proper value is determined, as before, by the relation that the ratio of turns of the transformer $T_{a2}$ is equal to the ratio of the coupling capacity $C_{ca}$ to the neutralizing capacity $C_{na}$. This value is best determined by trial, in the same manner as described for $C_{n1}$ and $C_{n2}$.

Figure $5^a$ represents a radio receiver including three stages of radio-frequency amplification, a detector and two stages of audio-frequency amplification. The high degree of radio amplification attainable from the three stages renders such a receiver more liable to regenerative effects, and therefore greater refinements are employed than may be necessary with only two stages. All stages are shielded from one another by the use of completely closed metal compartments. While primarily intended for electrostatic shielding, the metal compartments also serve as magnetic shields. The metal sheets forming the walls of these compartments should be thick enough and far enough removed from the coils to minimize eddy-current losses and particularly the flow of eddy-currents in such a way as to cause magnetic coupling between the stages. This latter condition requires especially that the joints in the compartments have good electrical contact throughout. If the metal shields are thick enough relative to the depth of penetration of the eddy-currents, the angles at which the coils are mounted are immaterial; otherwise these angles must be determined by trial, as described previously.

In place of using as the auxiliary coil a portion of the secondary coil, as was done in the preceding figures, a separate auxiliary coil $L_{n1}$, $L_{n2}$ or $L_{n3}$ is used in each stage. The auxiliary coil may be extremely closely coupled with the corresponding primary coil $L_{p1}$, $L_{p2}$ or $L_{p3}$ by interleaving the turns as represented in Figure $5^b$. There being now no necessity for very close coupling between the primary coil and any portion of the secondary coil, all coils may be wound on the same insulating tube, as shown in Figure $5^b$. For lower frequencies, where the single-layer type of secondary winding is preferably replaced by a multilayer coil, the primary and auxiliary coils may be of the pancake form, placed close together, as represented in Figure $5^c$.

To neutralize the natural capacity coupling of the audio-frequency tubes $A_{a1}$ and $A_{a2}$, neutralizing condensers $C_{na1}$ and $C_{na2}$ are employed, connected as in Figure 4 of my U. S. Letters Patent No. 1,489,228. This form of connection is necessary for $C_{na2}$ at least, as the loud-speaker L. S. will not in general be provided with an auxiliary coil required by the type of neutralizing employed in Figure 4 of the present specification, where the neutralizing condenser $C_{na}$ is connected between a grid and an auxiliary coil coupled to a coil in the plate circuit.

In Figure $5^a$ the following means are employed to keep the radio-frequency currents within the separate compartments and thereby to prevent them from flowing through common impedances which might serve to couple the stages. There is inserted an impedance $R_{g1}$, $R_{g2}$, $R_{g3}$, or $R_{gd}$ in series with each grid return wire; and from the grid return wire to the metal compartment (to which the filament is directly connected) is connected a condenser $C_{g1}$, $C_{g2}$, $C_{g3}$ or $C_{gd}$. Similarly there is inserted an impedance $R_{p1}$, $R_{p2}$, $R_{p3}$ or the primary coil of $T_{a1}$ in each plate circuit; and from the plate return wire to the metal compartment is connected a condenser $C_{p1}$, $C_{p2}$, $C_{p3}$ or $C'_{pd}$. Finally there is connected in series with each filament lead not connected directly to the metal compartment an inductance coil $L_{f1}$, $L_{f2}$, $L_{f3}$ or $L_{fd}$, having sufficiently low direct-current resistance not to absorb an appreciable part of the voltage of battery $B_a$, but having fairly high radio-frequency reactance. Theoretically, the impedances in the grid and plate return circuits should preferably be inductive, but practically this is unnecessary. For the grid circuits a non-inductive resistance of the order of one megohm is suitable. For the plate return circuits a non-inductive resistance of the order of one thousand ohms is suitable. The capacities $C_{g1}$, $C_{g2}$, $C_{g3}$, $C_{gd}$, $C_{p1}$, $C_{p2}$, $C_{p3}$, $C'_{pd}$ may be of the order of one one-hundredth microfarad or larger. The use of the grid return resistance $R_g$ permits obtaining a bias voltage from battery $B_c$ with a consequent reduction in the grid conductance and a corresponding increase in radio-frequency amplification over that obtained in the preceding figures.

The impedance $Z_{pd}$ in the plate circuit of the detector tube has two functions: first, it is made of relatively high direct-current resistance so as to reduce the direct-current plate potential of the detector tube D to a suitably lower value than that employed for the amplifier tubes; secondly, it is made of relatively high audio-frequency impedance, so as to cause the audio-frequency plate current to flow through the condenser $C_{pd}$ (which should have a large capacity—say of the order of one microfarad) instead of through the batteries, where it might cause appreciable audio-frequency coupling with the circuits of tubes $A_{a1}$ and $A_{a2}$. As an alternative to the use of $Z_{pd}$, a separate plate battery may be employed for the detector tube.

In Figure 5ª the control of the volume of sound issuing from the loud-speaker is attained by varying the coupling between the antenna coil $L_{pa}$ and its associated secondary coil $L_{sa}$. The grid condenser and grid leak of the preceding diagrams have been omitted, as an alternative method of detection. Detection by the use of a grid leak and grid condenser is usually more sensitive for weak signals, but less sensitive for strong signals. In circuits having relatively high tuning inductances and relatively low tuning capacities, detection may be poorer with the grid condenser and grid leak, even with weak signals.

Figures 6 and 7 show two forms of a radio receiver intended for rather lower frequencies than the preceding, and so employing coils of the type of Figure 5c. The use of lower frequencies makes the problem of electromagnetic coupling due to eddy-currents somewhat more difficult, as the depth of penetration of the eddy-currents in the metal walls of the compartments is greater. For this reason, separate metal compartments are used for each stage, although they are connected together by a common metal plate in Figure 6.

These receivers are intended to operate a relay whose rate of operation corresponds to the pulses of a radio telegraph system. Advantages are taken of the resistances $R_g$ and $R_p$ of Figure 5ª, with the associated capacities $C_p$ and $C_g$, to give two stages of low-frequency amplification by the reflex principle, employing resistance coupling. The resistance $R_g$ may be made of the order of one megohm, as before, but the resistance $R_p$ should be several times the plate resistance of the vacuum tube, to give suitable resistance-coupling amplification. The capacities $C_g$ and $C_p$ are so chosen that the time constant of the circuit formed by $C_g$ and $R_g$ is somewhat less than the duration of a single pulse; and the time constant of the circuit including $C_p$ ($C_{pd}$ plus $C'_{pd}$) and $R_p$ in parallel with the plate resistance of the vacuum tube is of the order of one tenth the duration of a single pulse. The result is that interfering pulses, due particularly to atmospheric disturbances, which may be of short duration are largely eliminated before reaching the relay. The capacity $C_r$ in parallel with the relay is adjusted to give this circuit a time constant of a similar order of magnitude, for the same purpose.

The intensity of the response at the relay is controlled by adjusting a tap on the antenna coil. This is an alternative to the use of the filament rheostat $R_{f12}$, Figure 4, or the use of the variable coupling between $L_{pa}$ and $L_{sa}$, Figure 5ª.

The resistance $R_s$, while not essential, has the function of keeping the grid potential of tube $A_r$ from becoming appreciably positive at any time and thus of limiting the rise in plate current to a value suitable for actuating the relay. This results in more uniform operation of the relay with signals of varying intensity. The value of $R_s$ may be of the order of five megohms.

The different grids in Figures 6 and 7 require different degrees of bias, which is attained in Figure 6 by the use of a tapped battery $B_c$.

Figure 7 differs from Figure 6 in that the filaments are connected in series in such order as to permit securing the most appropriate grid bias for each tube by connecting the grid return wires to some point in the series filament circuit. In this figure the condenser $C_a$ is used to ground the battery connections for radio-frequency current; for without its use radio-frequency current would flow from the antenna to the batteries by way of natural capacity and thence through the reactance of the series filament circuit to ground, causing coupling between the stages. By making the capacity $C_a$ sufficiently large (of the order of one microfarad), the batteries are at substantially ground potential to radio frequency and all filament points are maintained at this potential, thus eliminating such coupling effects.

In Figure 8 is shown a two-tube radio receiver in which the tube $A_1$ is used both as a radio-frequency and as an audio-frequency amplifier. In this figure neutralization is attained through the natural capacity $C_n$ existing between the apparatus connected to the two grids. This natural capacity may readily be made too large by mounting the two variable condensers close together. An adjustable grounded metallic shield S may then be interposed between these two condensers and moved until neutralization is attained. This method of neutralization may be convenient in certain cases, but is not so ideal as that previously described, for the reason that the close coupling desired between the coils $L_{p1}$ and $L_{s1}$ can not readily be attained without so placing these coils as to give relatively high natural capacity and dielectric loss.

In Figure 9 is shown a two-tube radio receiver in which the detector tube is made regenerative by tuning the plate circuit with a variable inductance L. Such an arrangement is suitable for radio reception of unmodulated continuous-wave telegraph signals by the heterodyne method. It has the advantage over the usual regenerative receiver in that the oscillation produced by the detector tube is not communicated to the antenna, where it would cause objectionable radiation. This localization of the oscillation is accomplished by eliminating couplings between the grid and plate circuits of vacuum tube $A_1$, particularly through the use of the neutralizing condenser $C_n$, as explained previously.

Figure 10 shows a radio receiver for use under the same circumstances as that of Figure 4, but employing both in the radio-frequency tubes and in the audio-frequency tubes the form of neutralization illustrated in Figure 1 of my U. S. Letters Patent No. 1,489,228, whereas all of the preceding diagrams show for the radio-frequency tubes the form of neutralization illustrated in Figure 2 of that patent. The connection of $C_{n_1}$ and $C_{n_2}$ shown in Figure 10 is not generally so desirable, as for ideal conditions the primary and secondary coils of the transformers $T_a$ and $T_1$ would need to be very closely coupled, which would tend to give high natural capacity and dielectric loss. If desired, neutralization between the circuits of $T_a$ and $T_2$ may be added, using any of the three arrangements illustrated in Figures 2, 3 and 4.

I claim:

1. The method of operating a tuned radio-frequency amplifier including a vacuum tube and an output transformer associated therewith, which consists in arranging the input conductance of said output transformer at resonance so that it is substantially higher in value than the plate conductance of said vacuum tube.

2. In a tuned radio-frequency amplifier, a vacuum tube and an output transformer pertaining thereto whose input conductance at resonance is substantially higher than the plate conductance of said vacuum tube.

3. In a tuned radio-frequency amplifier including a plurality of amplifying stages, a vacuum tube in each stage, and a step-up transformer in the plate circuit of said vacuum tube, the input conductance at resonance of said transformer being substantially higher than the plate conductance of said vacuum tube.

4. In a radio-frequency amplifier including a plurality of amplifying stages, each stage including a vacuum tube, each vacuum tube being provided with an input circuit and an output circuit, a variable condenser in each input circuit, a step-up transformer having primary and secondary coils for linking the output circuit of one vacuum tube to the input circuit of the succeeding vacuum tube, said coils being tuned as a whole by one of said condensers, the input conductance of each transformer at resonance being substantially higher than the plate conductance of the vacuum tube connected to its primary coil.

5. In a radio-frequency amplifier, a vacuum tube and a step-up output transformer pertaining thereto whose effective ratio of turns is substantially greater than the square root of the ratio of the plate conductance of said vacuum tube to the conductance of the secondary circuit of said transformer at resonance.

6. In a radio receiver, an amplifying tube for radio-frequency and audio-frequency currents, a detector, an input circuit and an output circuit for each, the output circuit of said amplifying tube being electrically linked to the input circuit of said detector, the output circuit of said detector being in turn linked to the input circuit of said amplifying tube, whereby audio-frequency currents are introduced into the input circuit of said amplifying tube from the output circuit of said detector, and means including a single condenser for neutralizing capacity coupling between the input circuit and the output circuit of said amplifying tube at both audio and radio frequencies.

7. In a radio-frequency amplifier, a plurality of stages, each stage being provided with a vacuum tube having grid, plate and filament electrodes and an input circuit and an output circuit, a step-up transformer having a coil in the output circuit of one stage and another coil in the imput circuit of the next succeeding stage whereby said stages are coupled together, a capacity which provides a direct low-impedance path for radio-frequency current from one of the coils of said transformer to the filament of the vacuum tube in that stage, batteries for said vacuum tube, and an impedance which prevents said radio-frequency current from flowing to said batteries whereby undesirable impedance coupling between the circuits to which said batteries are common is minimized.

8. In a radio-frequency amplifier including a vacuum tube having an input circuit and an output circuit, said circuits being undesirably coupled by capacity, apparatus including a coil in said input circuit and apparatus including a transformer in said output circuit, the method of reducing the undesirable capacity coupling between said input and output circuits which comprises arranging the high-potential terminal of the primary coil of said transformer to be of opposite polarity to the high-potential terminal of a secondary coil thereof, and placing a portion of the apparatus connected to said secondary coil so as to have natural capacity to a portion of the apparatus connected to the coil in said input circuit whereby said undesirable capacity coupling is at least partially neutralized.

9. In a tuned radio-frequency amplifier including a vacuum tube having an input circuit and an output circuit, said circuits being undesirably coupled by capacity, a coil and a variable tuning condenser in said input circuit, a transformer in said output circuit, and a variable condenser connected across a secondary coil of said transformer for tuning the same, the method of reducing the undesirable capacity coupling between said input and output circuits which comprises arranging the high-potential terminal of the primary coil of said transformer to be of opposite polarity to the high-potential terminal of said secondary coil thereof, and arranging said tuning condensers with respect to each other to produce an effective natural capacity therebetween, whereby said capacity coupling is at least partially neutralized.

10. In a tuned radio-frequency amplifier including a vacuum tube having an input circuit and an output circuit, said circuits being undesirably coupled by capacity, a coil in said input circuit and a transformer in said output circuit, the method of reducing the undesirable capacity coupling between said input and output circuits which comprises arranging said transformer so that the high-potential terminal of the primary coil thereof is of opposite polarity to the high-potential terminal of a secondary coil thereof, and arranging the coil in the input circuit and the transformer in the output circuit with respect to each other to produce an effective natural capacity between said input-circuit-coil and said secondary coil of said transformer, whereby said undesirable capacity coupling is at least partially neutralized.

11. In a tuned radio-frequency amplifier including a vacuum tube having an input circuit and an output circuit, said circuits being undesirably coupled by capacity, a transformer in said input circuit and another transformer in said output circuit, each of said transformers comprising a primary coil and a secondary coil, the method of reducing the undesirable capacity coupling between said input and output circuits which comprises arranging the output transformer so that the high-potential terminal of the primary coil thereof is of opposite polarity to the high-potential terminal of said secondary coil thereof, and arranging the input and output transformers with respect to each other to produce an effective capacity between the respective secondary coils of said transformers, whereby said undesirable capacity coupling is at least partially neutralized.

12. A radio receiver comprising a vacuum tube detector and a radio-frequency amplifier including at least one vacuum tube, said vacuum tubes having input and output circuits, a transformer coupling the first vacuum tube in said amplifier to an antenna, said transformer having such a step-up ratio that the capacity of the antenna is equivalent to a relatively small capacity in the secondary circuit of said transformer, a transformer coupling the output circuit of each vacuum tube in said amplifier to the input circuit of the succeeding vacuum tube, the secondaries of all transformers being electrically alike, an adjustable tuning condenser associated with the input circuit of each tube, all of said condensers being electrically alike, undesirable capacity coupling between the input and output circuits of each vacuum tube in said amplifier whereby there is a tendency toward oscillations, means for limiting said tendency so that detuning of the condensers for oscillation control is made unnecessary, and a separate graduated tuning dial connected with each tuning condenser for indicating the adjusted position thereof, the graduations on said dials reading substantially alike when said condensers are so adjusted that said input circuits are in substantial resonance with each other.

13. A radio receiver comprising a vacuum tube detector and a radio-frequency amplifier including at least one vacuum tube, said vacuum tubes having input and output circuits, a transformer coupling the first vacuum tube in said amplifier to an antenna, said transformer having such a step-up ratio that the capacity of the antenna is equivalent to a relatively small capacity in the secondary circuit of said transformer, a step-up transformer coupling the output circuit of each vacuum tube in said amplifier to the input circuit of the succeeding vacuum tube, the secondaries of all transformers being electrically alike, an adjustable tuning condenser associated with the input circuit of each tube, all of said condensers being electrically alike, undesirable capacity coupling between the input and output circuits of each vacuum tube in said amplifier whereby there is a tendency toward oscillations, means for limiting said tendency so that detuning of the condensers for oscillation control is made unnecessary, said means including a condenser and a coil connected in series between the grid and the filament system of said radio-frequency amplifying tube, and a separate graduated tuning dial connected with each tuning condenser for indicating the adjusted position thereof, the graduations on said dials reading substantially alike when said condensers are so adjusted that said input circuits are in substantial resonance with each other.

14. A radio-frequency amplifier including a plurality of amplifying stages, each stage including a vacuum tube provided with an input circuit and an output circuit, a variable tuning condenser in each input circuit, a transformer having a primary coil and a secondary coil for linking the output circuit of one vacuum tube to the input circuit of the succeeding vacuum tube, the input conductance of each transformer at resonance being substantially higher than the plate conductance of the vacuum tube connected with the primary coil thereof, the coils of each transformer being tunable as a unit over a predetermined frequency band by one of said condensers, and the adjusted capacities of all of said tuning condensers, in cooperation with the inductances of the coils with which said condensers are associated being in all stages substantially identical for maximum amplification at any given frequency within said band.

15. In a radio-frequency amplifier adapted to amplify signals at transmitted frequencies, a series of stages each of which includes a vacuum tube, each stage being tuned substantially to the frequency of the signals transmitted, and transformers having primary and secondary windings for linking adjacent stages, the primary winding of each transformer being in close physical coupling relation to a portion of the secondary winding thereof, the ratio of the number of secondary turns to primary turns of the windings of said transformers being such that the input conductance of each transformer at resonance is substantially higher than the plate conductance of the vacuum tube connected to the primary coil thereof.

16. A radio receiver comprising a vacuum tube detector and a radio-frequency amplifier including at least one vacuum tube, each vacuum tube being provided with an input circuit and an output circuit, a variable tuning condenser in each input circuit, a coil in the input circuit of the first vacuum tube, means including said coil for coupling the first vacuum tube in said amplifier to an antenna system such that the tuning of the input circuit of said tube is substantially unaffected by reasonable changes in the oscillation period of said antenna system, and means for linking the output circuit of each vacuum tube to the input circuit of the next succeeding vacuum tube, each input circuit being tunable over a predetermined frequency band by one of said condensers, the electrical constants of all tuned input circuits being alike, undesirable capacity coupling between the input and output circuits of each vacuum tube in said amplifier whereby there is a tendency toward oscillations, and means for limiting said tendency so that detuning of any of the input circuits for oscillation control is made unnecessary, whereby the tuning adjustments of all of said tuning condensers are substantially alike for maximum amplification at any given frequency setting within said band.

17. The method of operating a radio-frequency amplifier including a vacuum tube whose plate circuit is connected to the input terminals of an electric coupling system, and a second vacuum tube whose grid circuit is connected to the output terminals of said coupling system, which consists in tuning said coupling system, and in arranging said coupling system to step-up the voltage at resonance and to have an input conductance at resonance substantially higher in value than the plate conductance of the first-mentioned vacuum tube.

18. In a radio-frequency amplifier, a tunable electric coupling system having input terminals and output terminals, a vacuum tube whose plate circuit is connected to said input terminals, and a second vacuum tube whose grid circuit is connected to said output terminals, said coupling system having at resonance a step-up voltage ratio and an input conductance substantially higher than the plate conductance of the first-mentioned vacuum tube.

19. A radio receiver comprising a vacuum tube detector and a tuned radio-frequency amplifier including at least one vacuum tube, each vacuum tube being provided with an input circuit and an output circuit, means including a coil connected in the input circuit of the first vacuum tube in said amplifier for coupling said tube to an antenna system such that the tuning of the input circuit of said first vacuum tube is substantially unaffected by reasonable changes in the oscillation period of said antenna system, adjustably tuned means including a coil connected in the input circuit of each tube for coupling said tubes together, the electrical constants of all of the tuned circuits being substantially alike, undesirable capacity coupling between the input and output circuits of each tube of said amplifier whereby there is a tendency toward oscillations, and means for limiting said tendency so that detuning of any of said circuits for oscillation control is rendered unnecessary, whereby the adjustments for all of the tuned circuits are substantially the same at any given frequency setting within the range of the receiver.

20. In a radio-frequency amplifier including a vacuum tube having a filament system, an input circuit and an output circuit, said circuits being undesirably coupled by capacity, apparatus including a coil in said input circuit, a transformer in said output circuit, said transformer including a primary coil, a secondary coil, and a neutralizing coil, and apparatus connected to said secondary coil, the method of neutralizing the undesirable capacity coupling between said input and output circuits which comprises arranging the high-potential terminal of the primary coil of said transformer to be of opposite polarity to the high-potential terminal of said secondary coil thereof, and placing a portion of the apparatus connected to said secondary coil so as to have natural capacity to a portion of the apparatus connected to the coil in said input circuit, whereby a part of said undesirable capacity coupling is neutralized, and connecting a neutralizing capacity in series with said neutralizing coil between said grid electrode and the filament system whereby the remaining part of said undesirable capacity coupling is neutralized.

21. A tuned radio-frequency amplifier having an input circuit and including a vacuum tube having grid and plate electrodes, means for tuning said input circuit, a radio-frequency transformer having a primary winding with a low number of turns connected in the plate circuit of said vacuum tube, having a secondary winding with a number of turns great with respect to the number of primary turns connected in the input circuit of a second vacuum tube and having means for tuning said second input circuit, whereby the input conductance of said transformer at resonance is substantially greater than the plate conductance of said first-mentioned vacuum tube, the high-potential terminal of said secondary winding being of opposite polarity to the high-potential terminal of said primary winding, the means for tuning said last-mentioned input circuit circuit being operable over a frequency range for which said amplifier is unstable when said input circuits are tuned thereto, and means for maintaining the amplifier stable notwithstanding said input circuits are tuned throughout said frequency range.

In testimony whereof I affix my signature.

LOUIS A. HAZELTINE.

of said secondary coil thereof, and placing a portion of the apparatus connected to said secondary coil so as to have natural capacity to a portion of the apparatus connected to the coil in said input circuit, whereby a part of said undesirable capacity coupling is neutralized, and connecting a neutralizing capacity in series with said neutralizing coil between said grid electrode and the filament system whereby the remaining part of said undesirable capacity coupling is neutralized.

21. A tuned radio-frequency amplifier having an input circuit and including a vacuum tube having grid and plate electrodes, means for tuning said input circuit, a radio-frequency transformer having a primary winding with a low number of turns connected in the plate circuit of said vacuum tube, having a secondary winding with a number of turns great with respect to the number of primary turns connected in the input circuit of a second vacuum tube and having means for tuning said second input circuit, whereby the input conductance of said transformer at resonance is substantially greater than the plate conductance of said first-mentioned vacuum tube, the high-potential terminal of said secondary winding being of opposite polarity to the high-potential terminal of said primary winding, the means for tuning said last-mentioned input circuit circuit being operable over a frequency range for which said amplifier is unstable when said input circuits are tuned thereto, and means for maintaining the amplifier stable notwithstanding said input circuits are tuned throughout said frequency range.

In testimony whereof I affix my signature.

LOUIS A. HAZELTINE.

---

Certificate of Correction.

Patent No. 1,648,808.  Granted November 8, 1927, to

LOUIS A. HAZELTINE.

It is hereby certified that error appears in the printed specification of the above-numbered patent requiring correction as follows: Page 1, line 33, for the word "plat" read *plate;* page 7, lines 51 and 55, for the word "single" read *signal;* page 8, line 99, claim 7, for the misspelled word "imput" read *input;* page 11, line 33, claim 21, strike out the word "circuit," second occurrence; and that the said Letters Patent should be read with these corrections therein that the same may conform to the record of the case in the Patent Office.

Signed and sealed this 13th day of December, A. D. 1927.

[SEAL.]
M. J. MOORE,
*Acting Commissioner of Patents.*

DISCLAIMER 1,648,808.—*Louis A. Hazeltine*, Hoboken, N. J. WAVE SIGNALING SYSTEM. Patent dated November 8, 1927. Disclaimer filed March 8, 1932, by the assignee, *Hazeltine Corporation*.

Hereby enters its disclaimer to claims numbered 1, 2, 3, 4, 5, 14, 15, 17, 18, and 21, in said specification which are in the following words, to wit:

"1. The method of operating a tuned radio-frequency amplifier including a vacuum tube and an output transformer associated therewith, which consists in arranging the input conductance of said output transformer at resonance so that it is substantially higher in value than the plate conductance of said vacuum tube.

"2. In a tuned radio-frequency amplifier, a vacuum tube and an output transformer pertaining thereto whose input conductance at resonance is substantially higher than the plate conductance of said vacuum tube.

"3. In a tuned radio-frequency amplifier including a plurality of amplifying stages, a vacuum tube in each stage, and a step-up transformer in the plate circuit of said vacuum tube, the input conductance at resonance of said transformer being substantially higher than the plate conductance of said vacuum tube.

"4. In a radio-frequency amplifier including a plurality of amplifying stages, each stage including a vacuum tube, each vacuum tube being provided with an input circuit and an output circuit, a variable condenser in each input circuit, a step-up transformer having primary and secondary coils for linking the output circuit of one vacuum tube to the input circuit of the succeeding vacuum tube, said coils being tuned as a whole by one of said condensers, the input conductance of each transformer at resonance being substantially higher than the plate conductance of the vacuum tube connected to its primary coil.

"5. In a radio-frequency amplifier, a vacuum tube and a step-up output transformer pertaining thereto whose effective ratio of turns is substantially greater than the square root of the ratio of the plate conductance of said vacuum tube to the conductance of the secondary circuit of said transformer at resonance."

"14. A radio-frequency amplifier including a plurality of amplifying stages, each stage including a vacuum tube provided with an input circuit and an output circuit, a variable tuning condenser in each input circuit, a transformer having a primary coil and a secondary coil for linking the output circuit of one vacuum tube to the input circuit of the succeeding vacuum tube, the input conductance of each transformer at resonance being substantially higher than the plate conductance of the vacuum tube connected with the primary coil thereof, the coils of each transformer being tunable as a unit over a predetermined frequency band by one of said condensers, and the adjusted capacities of all of said tuning condensers, in cooperation with the inductances of the coils with which said condensers are associated being in all stages substantially identical for maximum amplification at any given frequency within said band.

"15. In a radio-frequency amplifier adapted to amplify signals at transmitted frequencies, a series of stages each of which includes a vacuum tube, each stage being tuned substantially to the frequency of the signals transmitted, and transformers having primary and secondary windings for linking adjacent stages, the primary winding of each transformer being in close physical coupling relation to a portion of the secondary winding thereof, the ratio of the number of secondary turns to primary turns of the windings of said transformers being such that the input-conductance of each transformer at resonance is substantially higher than the plate conductance of the vacuum tube connected to the primary coil thereof."

"17. The method of operating a radio-frequency amplifier including a vacuum tube whose plate circuit is connected to the input terminals of an electric coupling system, and a second vacuum tube whose grid circuit is connected to the output terminals of said coupling system, which consists in tuning said coupling system, and in arranging said coupling system to step-up the voltage at resonance and to have an input conductance at resonance substantially higher in value than the plate conductance of the first-mentioned vacuum tube.

"18. In a radio-frequency amplifier, a tunable electric coupling system having input terminals and output terminals, a vacuum tube whose plate circuit is connected to said input terminals, and a second vacuum tube whose grid circuit is connected to said output terminals, said coupling system having at resonance a step-up voltage ratio and an input conductance substantially higher than the plate conductance of the first-mentioned vacuum tube."

"21. A tuned radio-frequency amplifier having an input circuit and including a vacuum tube having grid and plate electrodes, means for tuning said input circuit, a radio-frequency transformer having a primary winding with a low number of turns connected in the plate circuit of said vacuum tube, having a secondary winding with a number of 1,648,808 turns great with respect to the number of primary turns connected in the input circuit of a second vacuum tube and having means for tuning said second input circuit, whereby the input conductance of said transformer at resonance is substantially greater than the plate conductance of said first-mentioned vacuum tube, the high-potential terminal of said secondary winding being of opposite polarity to the high-potential terminal of said primary winding, the means for tuning said last-mentioned input circuit being operable over a frequency range for which said amplifier is unstable when said input circuits are tuned thereto, and means for maintaining the amplifier stable notwithstanding said input circuits are tuned throughout said frequency range."

[*Official Gazette April 5, 1932.*]

DISCLAIMER 1,648,808.—*Louis A. Hazeltine*, Hoboken, N. J. WAVE SIGNALING SYSTEM. Patent dated November 8, 1927. Disclaimer filed September 11, 1935, by the patentee, the assignee, *Hazeltine Corporation*, assenting.

Hereby enters this disclaimer to claim 19 of said patent which is in the following words:

"19. A radio receiver comprising a vacuum tube detector and a tuned radio-frequency amplifier including at least one vacuum tube, each vacuum tube being provided with an input circuit and an output circuit, means including a coil connected in the input circuit of the first vacuum tube in said amplifier for coupling said tube to an antenna system such that the tuning of the input circuit of said first vacuum tube is substantially unaffected by reasonable changes in the oscillation period of said antenna system, adjustably tuned means including a coil connected in the input circuit of each tube for coupling said tubes together, the electrical constants of all of the tuned circuits being substantially alike, undesirable capacity coupling between the input and output circuits of each tube of said amplifier whereby there is a tendency toward oscillations, and means for limiting said tendency so that detuning of any of said circuits for oscillation control is rendered unnecessary, whereby the adjustments for all of the tuned circuits are substantially the same at any given frequency setting within the range of the receiver."

[*Official Gazette October 1, 1935.*]

Certificate of Correction.

Patent No. 1,648,808.                    Granted November 8, 1927, to

LOUIS A. HAZELTINE.

It is hereby certified that error appears in the printed specification of the above-numbered patent requiring correction as follows: Page 1, line 33, for the word "plat" read *plate;* page 7, lines 51 and 55, for the word "single" read *signal;* page 8, line 99, claim 7, for the misspelled word "imput" read *input;* page 11, line 33, claim 21, strike out the word "circuit," second occurrence; and that the said Letters Patent should be read with these corrections therein that the same may conform to the record of the case in the Patent Office.

Signed and sealed this 13th day of December, A. D. 1927.

[SEAL.]                                            M. J. MOORE,
*Acting Commissioner of Patents.*

DISCLAIMER 1,648,808.—*Louis A. Hazeltine*, Hoboken, N. J. WAVE SIGNALING SYSTEM. Patent dated November 8, 1927. Disclaimer filed September 11, 1935, by the patentee, the assignee, *Hazeltine Corporation*, assenting.

Hereby enters this disclaimer to claim 19 of said patent which is in the following words:

"19. A radio receiver comprising a vacuum tube detector and a tuned radio-frequency amplifier including at least one vacuum tube, each vacuum tube being provided with an input circuit and an output circuit, means including a coil connected in the input circuit of the first vacuum tube in said amplifier for coupling said tube to an antenna system such that the tuning of the input circuit of said first vacuum tube is substantially unaffected by reasonable changes in the oscillation period of said antenna system, adjustably tuned means including a coil connected in the input circuit of each tube for coupling said tubes together, the electrical constants of all of the tuned circuits being substantially alike, undesirable capacity coupling between the input and output circuits of each tube of said amplifier whereby there is a tendency toward oscillations, and means for limiting said tendency so that detuning of any of said circuits for oscillation control is rendered unnecessary, whereby the adjustments for all of the tuned circuits are substantially the same at any given frequency setting within the range of the receiver."

[*Official Gazette October 1, 1935.*]